Figure 1:
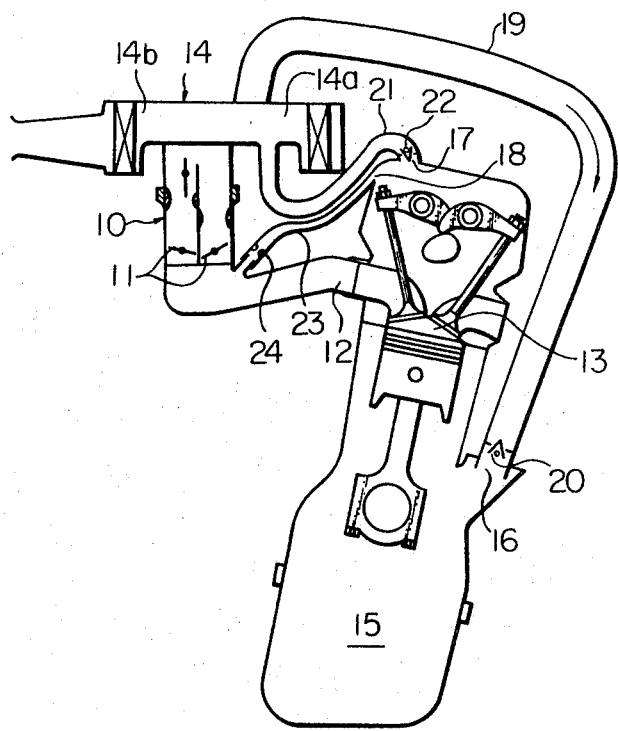

United States Patent

Sawada

[15] 3,673,997
[45] July 4, 1972

[54] AIR-POLLUTION PREVENTING SYSTEM

[72] Inventor: Hiraki Sawada, Tokyo, Japan

[73] Assignee: Nissan Motor Company, Limited, Yokohama, Japan

[22] Filed: Feb. 8, 1971

[21] Appl. No.: 113,204

[30] Foreign Application Priority Data

Feb. 13, 1970 Japan..................................45/12349

[52] U.S. Cl..........................................123/136, 123/119 B
[51] Int. Cl.............................F02m 59/00, F02b 33/00
[58] Field of Search......................................123/119 B, 136

[56] References Cited

UNITED STATES PATENTS 3,554,175   1/1971   Sarto .....................................123/136
3,517,654   6/1970   Sarto et al..............................123/136
3,589,347   6/1971   Sawada ..............................123/119 B
3,575,152   4/1971   Wentworth...........................123/136

*Primary Examiner*—Laurence M. Goodridge
*Assistant Examiner*—A. M. Zupcic
*Attorney*—John Lezdey

[57] ABSTRACT

An air-pollution preventive system for an internal combustion engine of a motor vehicle, adapted to eliminate the evaporative gases emitted from the fuel storage tank into the atmosphere for thereby reducing air pollution. The evaporative gases produced in the fuel storage tank are introduced to the crankcase of the engine and admitted to the combustion chamber of the engine through the carburetor of the engine together with the blow-by gases in the crankcase. The flow of the evaporative losses into the crankcase is controlled by valve means adapted to be responsive to pulsations in the pressure in the crankcase of the engine.

4 Claims, 2 Drawing Figures

INVENTOR
HIRAKI SAWADA

AIR-POLLUTION PREVENTING SYSTEM

This invention relates to an internal combustion engine of a motor vehicle and, more particularly, to an air-pollution preventing system for an internal combustion engine of a motor vehicle.

As is well known, hydrocarbon emissions from motor vehicles cause air pollution in urban areas particularly where a number of motor vehicles run. While considerations are paid to engine exhaust gases to solve air pollution problems, one of the important aspects of such problems is the evaporation of fuel from the fuel storage tank of the motor vehicle.

Various means have heretofore been proposed to reduce the evaporation of fuel to the atmosphere but is is quite difficult to completely eliminate the evaporative emissions from the fuel storage tank in a manner ready to be carried out.

According to the present invention, the fuel storage tank is associated with a prior art crankcase ventilation system having a valved air inlet formed in the crankcase structure for selectively sucking in fresh air into the crankcase for scavenging purposes. The fuel storage tank is connected to this air inlet of the crankcase by means of an evaporative gas passage to discharge the evaporative gases into the air inlet. The air inlet has check valves provided therein for controlling the flow of the evaporative gases thereinto from the fuel storage tank into the crankcase interior. The check valves are responsive to the fluctuations in pressure in the crankcase.

It is an object of this invention to provide an improved and novel vehicular air-pollution preventing system which is adapted to successfully eliminate evaporative emissions of fuel from the fuel storage tank in a compact manner.

Figure 2:
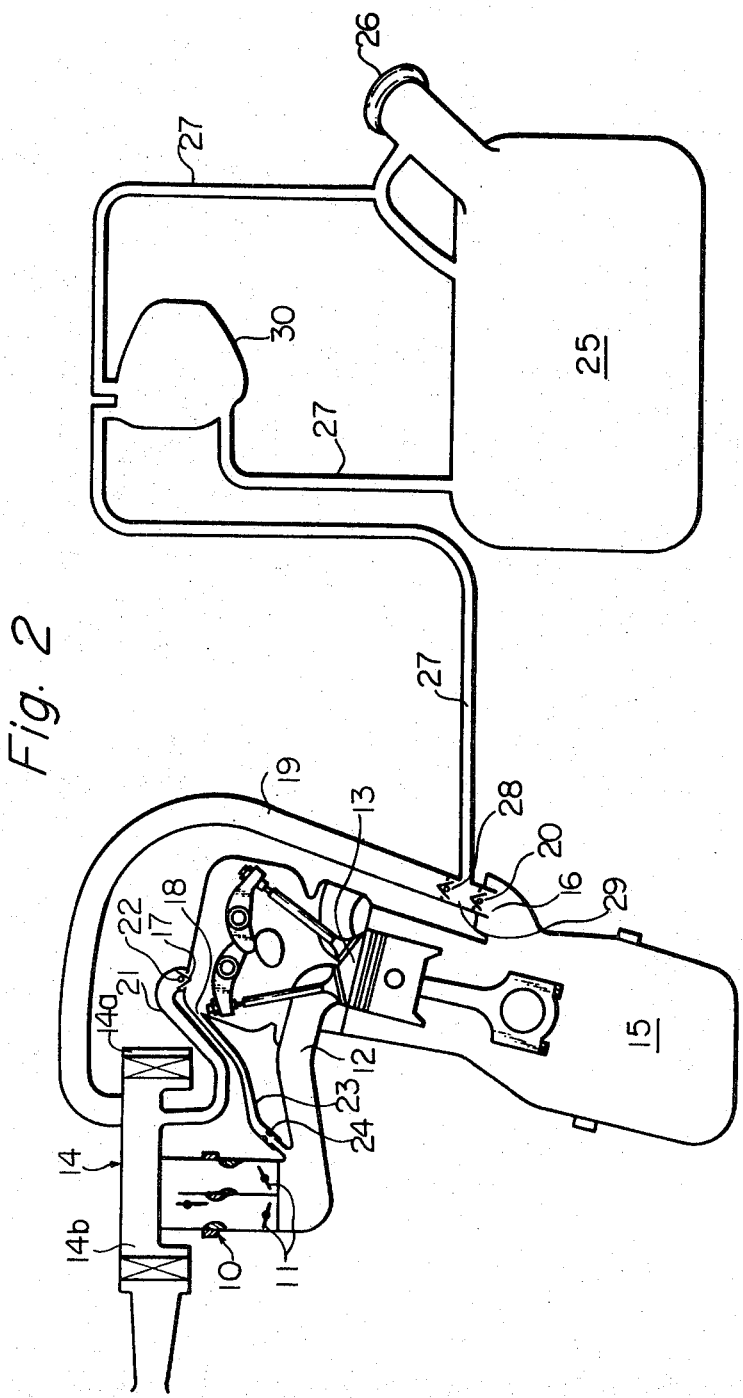

In the accompanying drawings:

FIG. 1 is a schematic view showing a general construction of a prior crankcase ventilation system to which this invention is directed; and FIG. 2 is a schematic view of a preferred example of a vehicular air-pollution preventing system according to the present invention.

Referring now to FIG. 1, the crankcase ventilation system is shown to comprise a carburetor 10 provided with a throttle valve 11 for controlling a fuel mixture to be supplied the engine, an intake manifold 12 leads from the carburetor 10 into a combustion chamber 13 of the engine, an air cleaner 14 associated with the carburetor 10, a crankcase 15 having a ventilation air inlet 16, blow-by gas mixture outlet 17 and 18, a ventilation air passage 19 having one end communicating with the air inlet 16 and the other end communicating with a dust side 14a of the air cleaner 14, a ventilation air check valve 20 provided in the air inlet 16, a blow-by gas mixture passage 21 connecting the outlet 17 to a clean side 14b of the carburetor 10, a branch passage 23 branched from the blow-by gas mixture passage 21 anterior to the check valve 22, and a restriction 24 provided in the branch passage 23 for restricting the flow of the blow-by gases therethrough.

The check valves 20 and 22 are so arranged that the valve 22 remains opened and the valve 20 closed when the pressure inside the crankcase 15 remains higher than the outside pressure and that the valve 22 remains closed and the valve 20 opened when the pressure the crankcase 15 remains lower than the outside pressure.

With the valve 22 kept open and the valve 20 closed, the blow-by gases emitted from the combustion chamber 13 are forced out of the outlet 17 of the crankcase 15 but prohibited from being released from the inlet 16 even though the pressure in the crankcase 15 exceeds the outside pressure. With the valve 22 kept closed and the valve 20 opened, on the contrary, fresh ventilation or scavanging air is introduced into the crankcase 15 by way of the air inlet 16 to scavange the crankcase interior so that the blow-by gases existing in the crankcase 15 mix with the ventilation air.

The blow-by gas mixture discharged out of the outlet 17 is drawn either to the dust side 14a or to the clean side 14b of the air cleaner 14, viz., to the carburetor 10 upstream of the throttle valve 11 by way of the blow-by gas mixture passage 21. The blow-by gas mixture is further mixed with engine inlet air and introduced into the combustion chamber 13 of the engine for re-combustion therein. The blow-by gas in the crankcase 15 is also discharged out of the outlet 18 into the carburetor 10 downstream of the throttle valve 11, so that the pressure in the crankcase interior can be lowered to such a level as is appropriate for the introduction of the ventilation air into the crankcase even though a check valve 22 having a relatively small size is used. Introduction of a portion of the blow-by gas mixture into the carburetor 10 downstream of the throttle valve 11 is moreover, conducive to the protection of the carburetor from corrosion in its entirety.

The present invention contemplates to have a fuel storage tank of the engine associated with the prior crankcase ventilation system as described above for successfully reducing the evaporative gases emitted to the atmosphere thereby to effectively eliminate the contamination of the atmosphere. Generally speaking, fuel vapors are produced in the fuel tank by temperature variations therein and is passed through the breather vent into the atmosphere thereby causing the contamination of the atmosphere.

According to the present invention, the evaporative gas from the fuel storage tank is passed over to the crankcase of the engine from which the evaporative gas, mixed with the blow-by gases existing in the crankcase, is passed through the carburetor into the combustion chamber of the engine for combustion therein. Introduction of the evaporative fuel from the fuel tank into the crankcase is controlled by valve means provided between the fuel tank and the crankcase. The valve means are adapted to actuate in response to pulsation in the crankcase of the engine.

A preferred example of an air-pollution preventing system implementing the concept described above is schematically shown in FIG. 2.

As shown, a fuel storage tank 25 has a cap 26 which is sealed off and communicates with the air inlet 16 of the crankcase 15 through an evaporative gas passage 27. An additional check valve 28 is provided in the air inlet 16, which check valve is adapted to control the introduction of the evaporative gases from the fuel tank 25 into the crankcase 15. As shown, the evaporative gas passage 27 communicates with the air inlet 16 at a point 29 intermediate the check valves 20 and 28. It should be understood that although the air inlet 16 is shown to communicate with the air cleanser 14 through the passage 19, the air inlet 16 may directly communicate with the atmosphere and an independent air cleaner may be directly provided at the air inlet 16, if desired, though not shown.

The check valves 20 and 28 are so arranged that the valve 20 is closed and the valve 28 opened when the pressure in the fuel tank 25 is lower than the pressure existing at point 29 and that the valve 20 is kept open and the valve 28 closed when the pressure in the fuel tank 25 is higher than the pressure existing at the point 29. A canister 30 may be provided in the evaporative gas passage 27 for adsorbing evaporative gas consituents emitted from the fuel tank 25. An adsorbent mounted in the canister 30 may be, for example, activated carbons.

When the evaporative gases are emitted from the fuel tank 25 due to a rise in temperature, a change in pressure, etc., these evaporative gases are admitted to the passage 27.

If, in this instance, the pressure in the fuel tank 25 is higher than the pressure existing at the point 29, the check valve 20 is opened while the valve 28 remains closed, so that the evaporative gases in the passage 27 are then admitted through the air inlet 16 into the crankcase 15. When, in this instance, the engine is kept shut down, the evaporative gases are temporarily stored in the crankcase 15. When the engine is started, the evaporative gases stored in the crankcase 15 mix with the blow-by gases therein and are admitted through the blow-by gas mixture passage 21, the carburetor 10 and the intake manifold 12 to the combustion chamber 13 of the engine for combustion therein. Thus, not only the air pollution is eliminated but also the fuel consumption is saved considerably.

If, on the contrary, the pressure in the fuel tank 25 is lower than the outside pressure due to a decrease in temperature or a decrease in fuel level in the tank 25 when the engine is operating, the check valve 28 is opened with the valve 20 kept closed so that the passage 27 is permitted to communicate with the atmosphere thereby to prevent a subatmospheric pressure from occurring in the fuel tank 25. Even if the fuel level abruptly drops due to a sudden decrease in the ambient temperature just after the engine starts running, the subatmospheric pressure developed in the fuel tank 25 acts on only the check valve 28 to open, permitting the fresh air to be drawn into the passage 27 and accordingly into the tank 25. Since, at this instant, the check vale 20 remains closed, foreign materials such as dusts and sludges or the blow-by gases in the crankcase 15 are prevented from entering the fuel tank 25.

It should now be understood that the evaporative gases from the fuel tank are passed over to the carburetor, in a reliable and simplified manner, where evaporative gases are mixed with the fuel mixture to be supplied to the engine, whereby not only the air pollution is reduced reliably but the fuel is utilized economically.

What is claimed is:

1. An air-pollution preventive system for an internal combustion engine having a crankcase, a carburetor, and a fuel tank for storing a liquid fuel to be supplied to said engine, which system comprises, in combination, first means to recirculate the blow-by gases in said crankcase to said engine when pressures prevail in said crankcase, second means to suck in atmospheric air into said crankcase when substmospheric pressures prevail in said crankcase thereby to scavange said blow-by gases in said crankcase, said second means including a first passage vented from the atmosphere and a first check valve mounted in said first passage, and third means to introduce evaporative gases emitted from said fuel tank into said carburetor through said crankcase, said third means including a second check valve mounted in said first passage for controlling the flow of said evaporative gases, and a second passage for delivering the evaporative gases, said second passage communicating with said first passage at a position intermediate said first and second check valves and with said fuel tank, said check valves being responsive to pressure differences between pressures in said fuel tank and in said crankcase, so that when the pressure in said fuel tank exceeds the pressure in said crankcase, said first check valve opens to admit the evaporative gases to said crankcase and concurrently said second check valve closes to prevent the evaporative gases from escaping to the atmosphere and when the pressure in said fuel tank is lower than in said crankcase, said second check valve opens to admit atmospheric pressure into the fuel tank and concurrently said first check valve closes to prevent contamination.

2. In combination with an internal combustion engine having a crankcase, a carburetor, and a fuel tank for storing a liquid fuel to be supplied to said engine, said air-pollution preventive system comprising a ventilation air inlet provided in said crankcase and opened to the atmosphere, a ventilation air check valve mounted in said ventilation air inlet, a blow-by gas mixture outlet provided in said crankcase, a blow-by gas mixture passage connecting said outlet to the carburetor, a blow-by gas mixture check valve mounted in said blow-by mixture passage, an evaporative gas passage communicating with said fuel tank and with said ventilation air inlet for discharging evaporative gas from said fuel tank into said crankcase, and an evaporative gas check valve mounted in said ventilation air inlet and associated with said ventilation air check valve, said evaporative gas passage intersecting said ventilation air inlet at a point intermediate said ventilation air check valve and said evaporative gas check valve, said ventilation air check valve and said evaporative gas check valve being responsive to differences between pressures in said fuel tank and in said crankcase, so that when the pressure in said fuel tank exceeds the pressure in said crankcase, said ventilation air check valve opens to admit evaporative gases to said crankcase and concurrently said evaporative gas check valve closes to prevent the evaporative gases from escaping to the atmosphere and when the pressure in said fuel tank is lower than in said crankcase, said evaporative gas check valve opens to admit atmospheric pressure into the fuel tank and concurrently said ventilation air check valve closes to prevent contamination.

3. An air-pollution preventing system according to claim 2, further comprising a branch passage branched from said blow-by gas mixture passage before said blow-by gas mixture check valve and communicating with said carburetor downstream of the throttle valve of the carburetor, said branch passage having a restricting means mounted therein for restricting the flow of blow-by gases passing therethrough.

4. An air-pollution preventing system according to claim 2, further comprising a vapor adsorption means provided in said evaporative gas passage for adsorbing evaporative gases passing therethrough.

* * * * *